A. L. McMURTRY.
IGNITION GENERATOR FOR ELECTRIC STARTER SYSTEMS.
APPLICATION FILED MAR. 13, 1913.
1,129,216.
Patented Feb. 23, 1915.
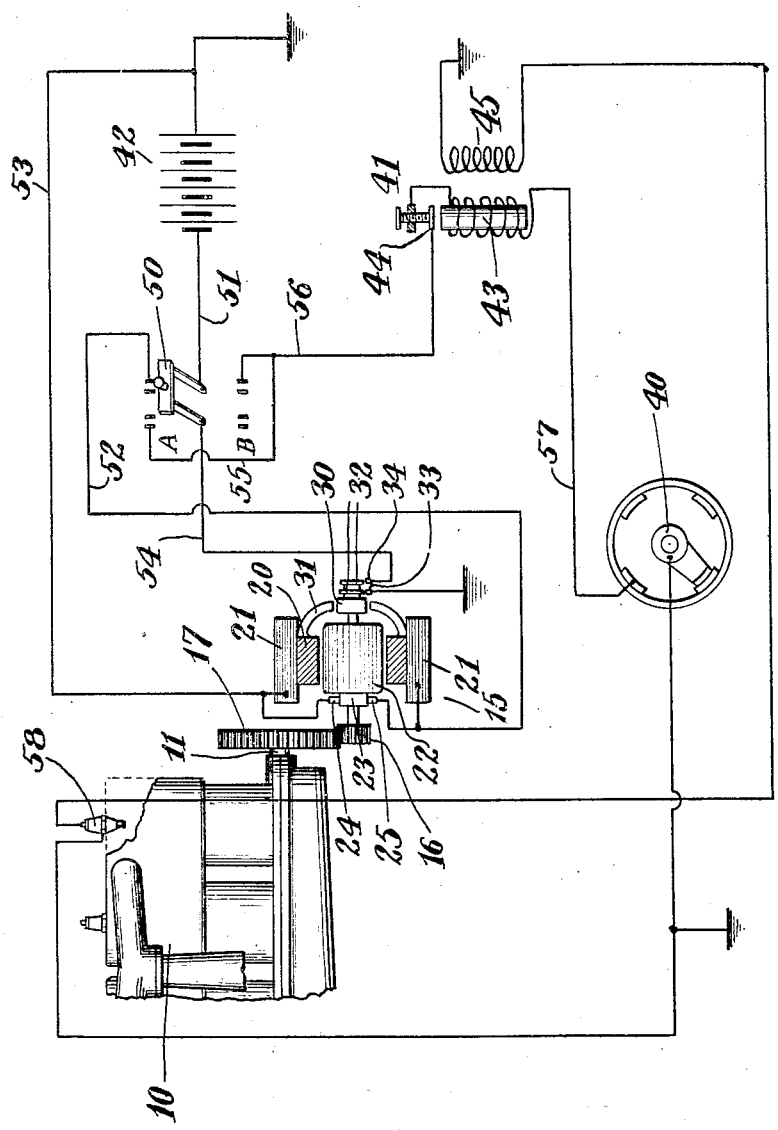
WITNESSES
INVENTOR
Alden L. McMurtry
BY
E. W. Marshall
ATTORNEY

UNITED STATES PATENT OFFICE.

ALDEN L. McMURTRY, OF SOUND BEACH, CONNECTICUT.

IGNITION-GENERATOR FOR ELECTRIC STARTER SYSTEMS.

1,129,216.  Specification of Letters Patent.  Patented Feb. 23, 1915.

Application filed March 13, 1913. Serial No. 753,941.

*To all whom it may concern:*

Be it known that I, ALDEN L. MCMURTRY, a citizen of the United States, and a resident of Sound Beach, in the county of Fairfield and State of Connecticut, have invented certain new and useful Improvements in Ignition-Generators for Electric Starter Systems, of which the following is a specification, reference being had to the drawings, forming a part thereof.

My invention relates to starting and ignition devices for internal combustion engines and it has special reference to such as are adapted for use on automobiles and other motor vehicles.

One object of my invention is to provide apparatus of the character above indicated and a control system embodying the same that shall be simple and durable in arrangement and construction and effective in operation.

Other objects of my invention will be set forth hereinafter.

Referring to the drawings; the single figure is a diagrammatic view of a system embodying my invention and arranged in accordance therewith, a portion of an internal combustion engine being shown in side elevation.

10 indicates an internal combustion engine having a shaft 11. A dynamo-electric machine 15 is operatively connected to the engine by suitable gearing such for example as a pinion 16 and a gear wheel 17. The dynamo-electric machine comprises a field magnet 20, magnetizing coils 21 therefor and an armature 22. The armature has a commutator 23 and brushes 24 and 25. An auxiliary armature 30 is mounted on the same shaft with the armature 22 or is otherwise associated with it and operatively connected to it.

The magnetic field in which the auxiliary armature 30 operates is produced by projections 31 which form parts of the field magnet 20. The auxiliary armature is provided with collector rings 32 and brushes 33 and 34. In addition to the dynamo-electric machine the system comprises the usual timing device 40, a battery 42, a spark or induction coil 41 and a control switch 50. The induction coil comprises a primary winding 43, a vibrator 44, and a secondary winding 45. The battery may be either a primary or a secondary battery or some other suitable source of energy.

The operation of the system is as follows: The control switch is adapted to occupy two positions A and B and if the engine is at rest and it is desired to start it, the operator throws the switch to position A. Energy is then supplied to the dynamo-electric machine, a circuit being completed from one terminal of the battery through a conductor 51, one blade of the switch 50, a conductor 52, the brush 25, commutator 23, brush 24, and a conductor 53 to the opposite terminal of the battery. The dynamo-electric machine now acts as a motor in the ordinary way and turns over the engine. At the same time alternating current energy is generated in the auxiliary armature 30 and is supplied to the induction coil, a circuit being established from the collector ring 34 through a conductor 54, the other blade of the switch 50, a cross connection 55, a conductor 56, the vibrator 44, the primary coil 43, a conductor 57 and the timing device 40 to ground, the other collector ring 33 of the generator armature being grounded. The secondary winding 45 is then inductively energized and supplies current to a spark plug 58 of the engine. The engine will of course have the usual number of spark plugs depending upon the number of cylinders although I have only illustrated the circuit connections for one. Thus, at starting, the ignition apparatus is supplied from the auxiliary generator armature and the battery is only used for supplying energy to the starting motor. The switch is thrown into positon B as soon as the engine is running and the motor is then disconnected from the battery and the battery is connected to the ignition apparatus, the circuit being completed from conductor 51 to conductor 56 through the switch blade at the right in the drawing.

When current is drawn from the battery to energize the starting motor and start the engine its voltage is temporarily reduced under usual conditions because the motor is only in use for short periods of time and constitutes a relatively large load for the battery. Consequently it is particularly desirable to provide an auxiliary generator such as the generator 30 to supply the ignition apparatus during the starting period. On the other hand the generator and the starting motor are parts of the same machine and are only in use for short intervals of time. The dynamo-electric machine may consequently be constructed in a simple and inexpensive manner and without necessarily having a high efficiency.

The dynamo-electric machine may have only a single armature arranged in a well known manner to act both as a motor and as a generator within the scope of my invention but I prefer to use a separate auxiliary armature in order to make the generated voltage independent of the load on the main starting motor armature.

I desire that variations of size and arrangement of parts which do not depart from the spirit of my invention shall be included in the scope of the appended claims.

What I claim is:

1. The combination with a combustion engine, an ignition circuit, a source of energy, an electric starting motor and an ignition generator operatively connected thereto, of means for connecting the ignition circuit to the ignition generator and the starting motor to said source of energy for starting the engine, and for disconnecting the ignition circuit from the ignition generator and connecting said circuit to said source of energy for operating the engine.

2. The combination with a combustion engine, an ignition circuit, a battery, an electric starting motor and an ignition generator incorporated therewith, of a switch for connecting the ignition circuit to the ignition generator and the starting motor to the battery for starting the engine, and connecting the ignition circuit to the battery for operating the engine.

3. The combination with a combustion engine, an electric starting motor, an ignition generator incorporated therewith, and a battery, of means for connecting the starting motor to the battery for actuating the moving parts of the engine to start the engine and for connecting the ignition generator with the ignition circuit and for disconnecting the starting motor from the battery and the ignition generator from the ignition circuit.

4. The combination with a combustion engine, a dynamo electric machine comprising a field magnet having auxiliary polar projections, a winding for the magnet, a starting motor armature and an auxiliary ignition generator armature, of a battery and means for connecting the starting motor armature to the battery for actuating the moving parts of the engine, and for utilizing the ignition generator armature only when the starting motor armature is connected to the battery.

5. The combination with a combustion engine, an ignition circuit, an electric starting motor, an ignition generator incorporated therewith, and a battery, of a switch adapted to occupy two positions and arranged to connect in one position the starting motor to the battery, and in the other position, the ignition circuit to the battery.

6. The combination with a combustion engine, an ignition circuit, an electric starting motor, an ignition generator incorporated therewith, and a battery, of a switch adapted to occupy two positions and arranged to connect in one position the starting motor to the battery and the ignition generator to the ignition circuit, and in the other position the ignition circuit to the battery.

7. The combination with a combustion engine, an ignition circuit, a battery and an ignition generator therefor, a starting motor, a switch for connecting the ignition circuit with either the battery or the generator, and for connecting the battery with the motor when the ignition circuit is connected with the generator.

In witness whereof, I have hereunto set my hand this 14th day of February in the year 1913.

ALDEN L. McMURTRY.

Witnesses:
 RICHARD O. SMITH,
 E. W. LEE.